Nov. 20, 1956  G. J. CARSON ET AL  2,771,571
MAGNETIC CHUCK FACE PLATE
Filed April 8, 1952  2 Sheets-Sheet 2
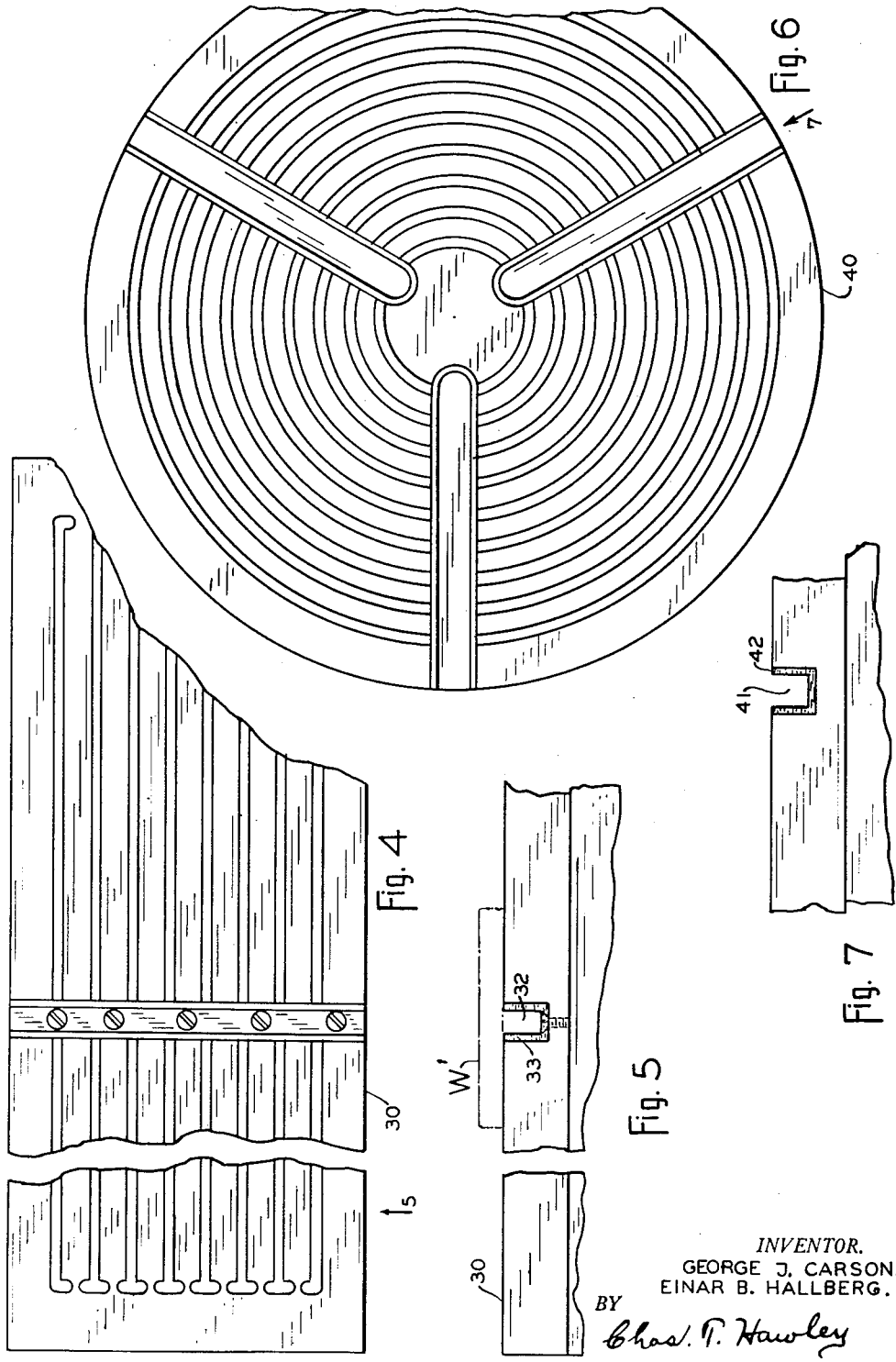
INVENTOR.
GEORGE J. CARSON.
EINAR B. HALLBERG.
BY
Chas. T. Hawley
ATTY.

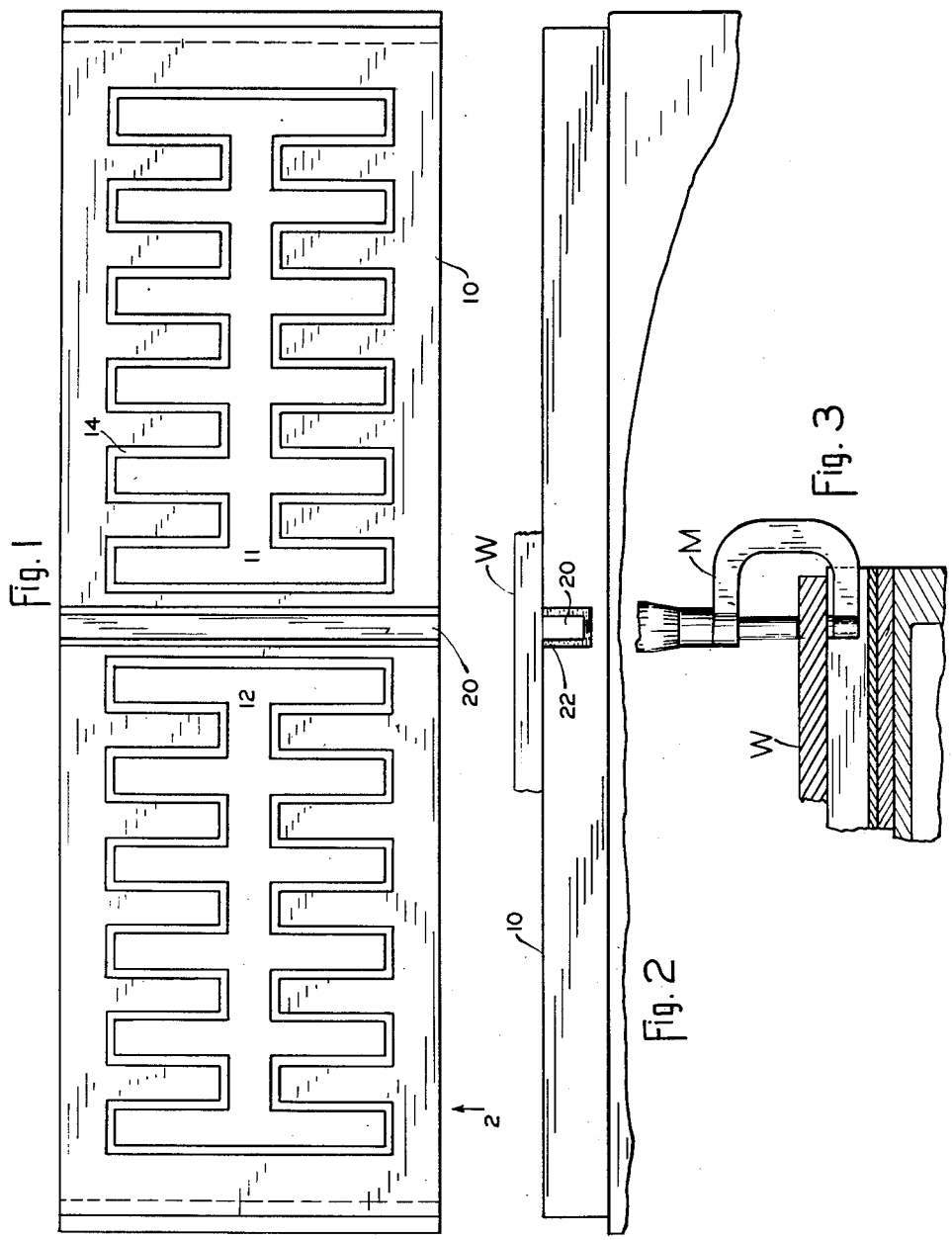

United States Patent Office 2,771,571
Patented Nov. 20, 1956

2,771,571

MAGNETIC CHUCK FACE PLATE

George J. Carson, West Boylston, and Einar B. Hallberg, Holden, Mass.

Application April 8, 1952, Serial No. 281,202

1 Claim. (Cl. 317—162)

This invention relates to magnetic chucks of the type in which the work is held against a face plate by electromagnetic force. Such face plates commonly support the work on a flat upper surface thereof.

It is the general object of this invention to provide a face plate for a magnetic chuck which is so designed as to facilitate accurate or micrometer measurements of the thickness of a piece of work while it is held on the chuck and without release of the magnetic holding force.

To the attainment of this general object, we provide a face plate having a recessed portion which permits a measuring device, such as a micrometer, to be conveniently applied to a piece of work while it is mounted on and supported by the face plate. We also make provision to prevent contact between the measuring device and any magnetized surface of the chuck or face plate, as such contact would reduce the sensitivity.

Our invention further relates to arrangements and combinations of parts which will be hereinafter described and more particularly pointed out in the appended claim.

Preferred forms of the invention are shown in the drawings, in which

Fig. 1 is a plan view of a magnetic chuck face plate embodying our invention;

Fig. 2 is a side elevation, looking in the direction of the arrow 2 in Fig. 1;

Fig. 3 is a detail sectional view illustrating the utility of the invention;

Fig. 4 is a partial plan view showing the invention incorporated in a different type of face plate;

Fig. 5 is a partial side elevation, looking in the direction of the arrow 5 in Fig. 4;

Fig. 6 is a partial plan view of a circular face plate embodying the invention; and Fig. 7 is a partial side elevation, looking in the direction of the arrow 7 in Fig. 6.

Referring to Figs. 1 to 3, we have shown a conventional type of face plate in which the outer portion of the plate 10 is of one polarity and the insert members 11 and 12 are of opposite polarity, and in which the members 10 and 11 or 10 and 12 are separated by a substantial thickness 14 of type metal or other non-magnetic material.

The novel feature of our improved face plate is the provision of a transverse groove or recess 20, which extends entirely across the face plate and which is open at both ends. The groove or recess 20 has a facing 22 at both sides and at the bottom, which facing will also be of type metal or of other non-magnetic material.

The object of the groove or recess 20 is to permit a micrometer M (Fig. 3) to be freely inserted in the recess 20 in position to accurately measure the thickness of the work W while the work is firmly clamped to the plate 10 and without releasing the current in the magnetic circuit.

The non-magnetic facing of the recess 20 is of great importance, as otherwise the micrometer would be attracted by the magnetized face plate and would be so firmly held that it would be seriously lacking in sensitivity.

In Figs. 4 and 5, we have shown the invention as applied to another face plate 30, also of conventional type but comprising alternate bars duly separated by non-magnetic material. A piece of work W' may be held on the plate 30 and may be gauged by inserting a micrometer in a transverse groove or recess 32 having a non-magnetic facing 33 and corresponding in function to the groove 20 previously described.

In Figs. 6 and 7, the invention is shown as applied to a circular face plate 40 having radiating grooves or recesses 41 duly provided with non-magnetic facings 42, the use and utility of these recesses being as previously described.

Having thus described our invention and the advantages thereof, we do not wish to be limited to the details herein disclosed, otherwise than as set forth in the claim, but what we claim is:

In a magnetic chuck, a face plate having a magnetic work-supporting surface and having a grooved clearance recess in said surface, and said grooved recess having a facing of non-magnetic material lining the sides and bottom thereof and effective to prevent magnetic adherence to any part of the structure enclosing said grooved recess of any ferrous object inserted in said recess.

References Cited in the file of this patent

UNITED STATES PATENTS

| | | |
|---|---|---|
| 1,301,135 | Karasick | Apr. 22, 1919 |
| 2,366,919 | Lillquist et al. | Jan. 9, 1945 |
| 2,475,456 | Norlander | July 5, 1949 |
| 2,561,769 | Anderson | July 24, 1951 |

OTHER REFERENCES

Walker Magnetic Chuck 1914, p. 16. (Catalogue G) O. S. Walker & Co., Worcester, Massachusetts.